(12) United States Patent
Bandi et al.

(10) Patent No.: US 12,099,430 B1
(45) Date of Patent: Sep. 24, 2024

(54) HOST STORAGE OF CONTAINER LOGS

(71) Applicant: VMware LLC, Palo Alto, CA (US)

(72) Inventors: Krishna Chaitanya Bandi, Pflugerville, TX (US); Abhishek Srivastava, Mountain View, CA (US); Rohith Jagannathan, Palo Alto, CA (US); Matthew Hinton, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/225,438

(22) Filed: Jul. 24, 2023

(51) Int. Cl.
*G06F 11/34* (2006.01)
*G06F 11/30* (2006.01)

(52) U.S. Cl.
CPC ...... *G06F 11/3476* (2013.01); *G06F 11/3068* (2013.01)

(58) Field of Classification Search
None
See application file for complete search history.

(56) References Cited

U.S. PATENT DOCUMENTS

| | | | |
|---|---|---|---|
| 10,915,417 B1* | 2/2021 | Kumar | G06F 17/40 |
| 10,956,299 B2 | 3/2021 | Krishnan et al. | |
| 11,336,505 B2* | 5/2022 | Movsisyan | H04L 41/0631 |
| 2017/0359215 A1* | 12/2017 | Movsisyan | H04L 41/069 |
| 2018/0143744 A1* | 5/2018 | Movsisyan | G06F 8/38 |
| 2018/0144125 A1* | 5/2018 | Frank | G06F 11/3006 |
| 2020/0034224 A1* | 1/2020 | Nagendra | G06F 11/004 |
| 2021/0081441 A1* | 3/2021 | Kaushik | G06F 9/45558 |

FOREIGN PATENT DOCUMENTS

| | | |
|---|---|---|
| CN | 107426023 B | 5/2020 |
| CN | 109491859 B | 10/2021 |

* cited by examiner

*Primary Examiner* — Quang N Nguyen
(74) *Attorney, Agent, or Firm* — Quarles & Brady LLP

(57) ABSTRACT

A log is received at a user space process of a host from a logical logging component of a virtual computing instance (VCI), the log generated by a container running on the VCI. The log is communicated from the user space process to a logical logging component of the host. The log is communicated from the logical logging component of the host to a logging process of the host. The log is configured and stored in host storage.

15 Claims, 3 Drawing Sheets

HOST STORAGE OF CONTAINER LOGS

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines and containers, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

DETAILED DESCRIPTION

Figure 1A:
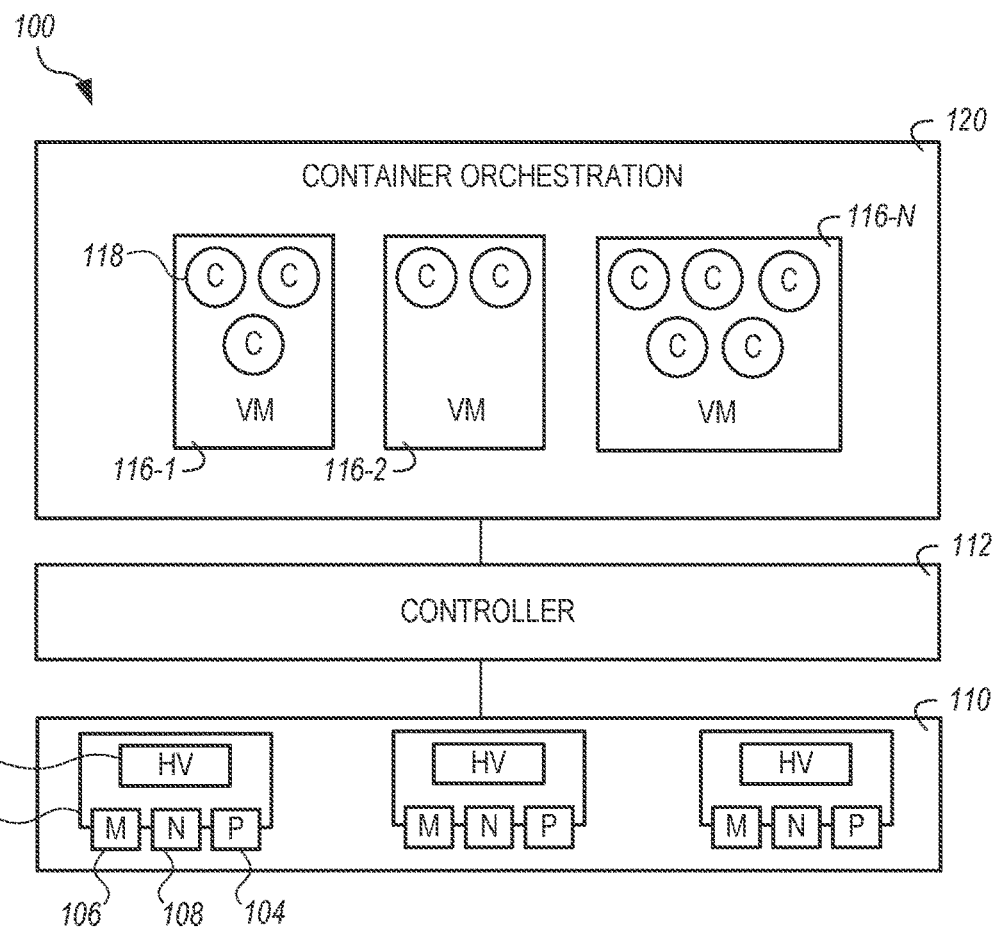
FIG. 1A is a diagram of an example of a container orchestration as an application in a system for host storage of container logs in accordance with a number of embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes (which may be referred to herein simply as "nodes"). Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use namespaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

A containerized workload (sometimes referred to herein simply as a "container") that runs in a virtualized environment can generate event logs (referred to herein as "logs"). A log is a chronologically ordered list of recorded events concerning the container. Logs can allow the determination of the causes of errors, for instance. However, because containers are stateless, their logs are typically sent and persisted elsewhere so that they survive in the event the container crashes, for instance. In previous approaches, logs are communicated to one or more locations depending on what is available in the platform and how it is configured. In some approaches, logs are sent to local ephemeral storage and not persisted at all. In other approaches where persistence is desired, logs can be sent to a persistent storage on a VCI running the container, or to a remote logging service. However, previous approaches may be lacking because, in some instances, the VCI on which the container runs does not have local allocated storage and may not be connected to a remote logging service. For example, the VCI may not have the networking and/or bandwidth capability needed for remote logging, or may not be able to afford the local memory footprint because it is too lightweight. Additionally, as known to those of skill in the art, logs are comparatively small-on the order of a few kilobytes-while most available allocated storage is much larger-on the order of several megabytes or gigabytes, for instance. Thus, allocating local storage dedicated for container logs is an inefficient usage of resources.

Embodiments of the present disclosure include a mechanism for logs of containers in a virtualized environment to be redirected to the underlying host. The host, having its own storage already available, can accommodate the additional footprint associated with the logs in terms of memory and storage. As will be discussed further below, embodiments herein can include redirecting container logs to a logical logging component (e.g., a /dev/log) on the VCI using identifiers of the respective container(s) in the logs themselves. A user space process (e.g., the VCI's virtual machine executable (VMX) process) can redirect the logs to the hosts logging process (e.g., syslog daemon), which can then redirect the logs to the appropriate destination (e.g., folder), that corresponds to the container(s), using the identifier(s).

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 228 may reference element "28" in FIG. 2, and a similar element may be referenced as 928 in FIG. 9. Analogous elements within a Figure may be referenced with a hyphen and extra numeral or letter. Such analogous elements may be generally referenced without the hyphen and extra numeral or letter. For example, elements 116-1, 116-2, and 116-N in FIG. 1A may be collectively referenced as 116. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1A is a diagram of an example of a container orchestration as an application in a system for host storage of container logs in accordance with a number of embodiments of the present disclosure. The system 100 can include hosts 102 with processing resources 104 (e.g., a number of processors), memory resources 106, and/or a network interface 108. The hosts 102 can be included in a software defined data center 110. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API), which can be provided by a controller 112. The hosts 102 can be in communication with the controller 112. In some embodiments, the controller 112 can be a server, such as a web server.

The hosts 102 can incorporate a hypervisor 114 that can execute a number of virtual computing instances 116-1, 116-2, . . . , 116-N (referred to generally herein as "VCIs 116"). The VCIs can be provisioned with processing resources 104 and/or memory resources 106 and can communicate via the network interface 108. The processing resources 104 and the memory resources 108 provisioned to the VCIs can be local and/or remote to the hosts 102. For example, in a software defined data center, the VCIs 116 can be provisioned with resources that are generally available to the software defined data center and not tied to any particular hardware device. By way of example, the memory resources 106 can include volatile and/or non-volatile memory available to the VCIs 116. The VCIs 116 can be moved to different hosts (not specifically illustrated), such that a different hypervisor 114 manages the VCIs 116.

In the example illustrated in FIG. 1A, the VCIs 116 are virtual machines ("VMs") that each include a container virtualization layer to provision a number of containers 118. With respect to the virtual machines 116, the hosts 102 can be regarded as virtual machine hosts. With respect to the containers provisioned from container images provided by a virtual machine (e.g., virtual machine 116-1), the virtual machine 116 and the container virtualization layer can be regarded as a container host. In FIG. 1A, the controller 112 hosts the container orchestration system 120 (e.g., a container cluster) as an application.

Figure 1B:
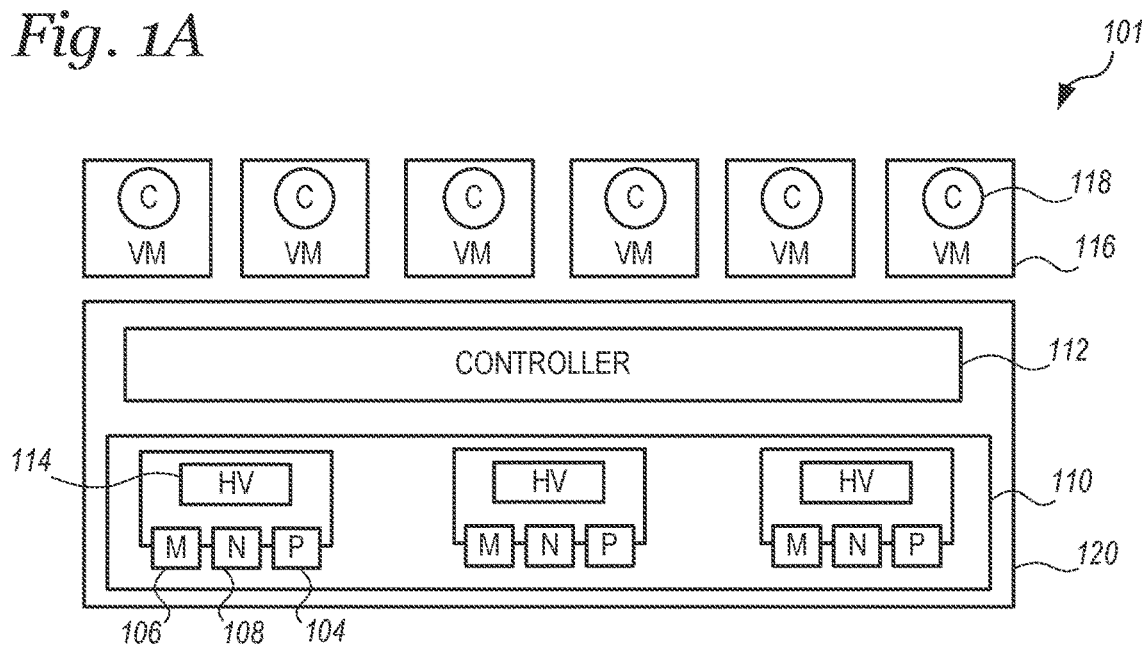
FIG. 1B is a diagram of an example of integrated container orchestration in a system for host storage of container logs in accordance with a number of embodiments of the present disclosure.

FIG. 1B is a diagram of an example of integrated container orchestration in a system for host storage of container logs in accordance with a number of embodiments of the present disclosure. FIG. 1B is analogous to FIG. 1A, except that the container orchestration system 120 and the controller 112 are an embedded system. Furthermore, the VCIs 116 can be referred to as pod virtual machines that each host a container 118. A pod is the smallest deployable unit of computing that can be created and managed by the container orchestration system 120. In contrast, in FIG. 1A, each VCI 116 can provision a number of pods. In some embodiments, the container orchestration system can be a third-party system not managed by the controller 112.

Figure 2:
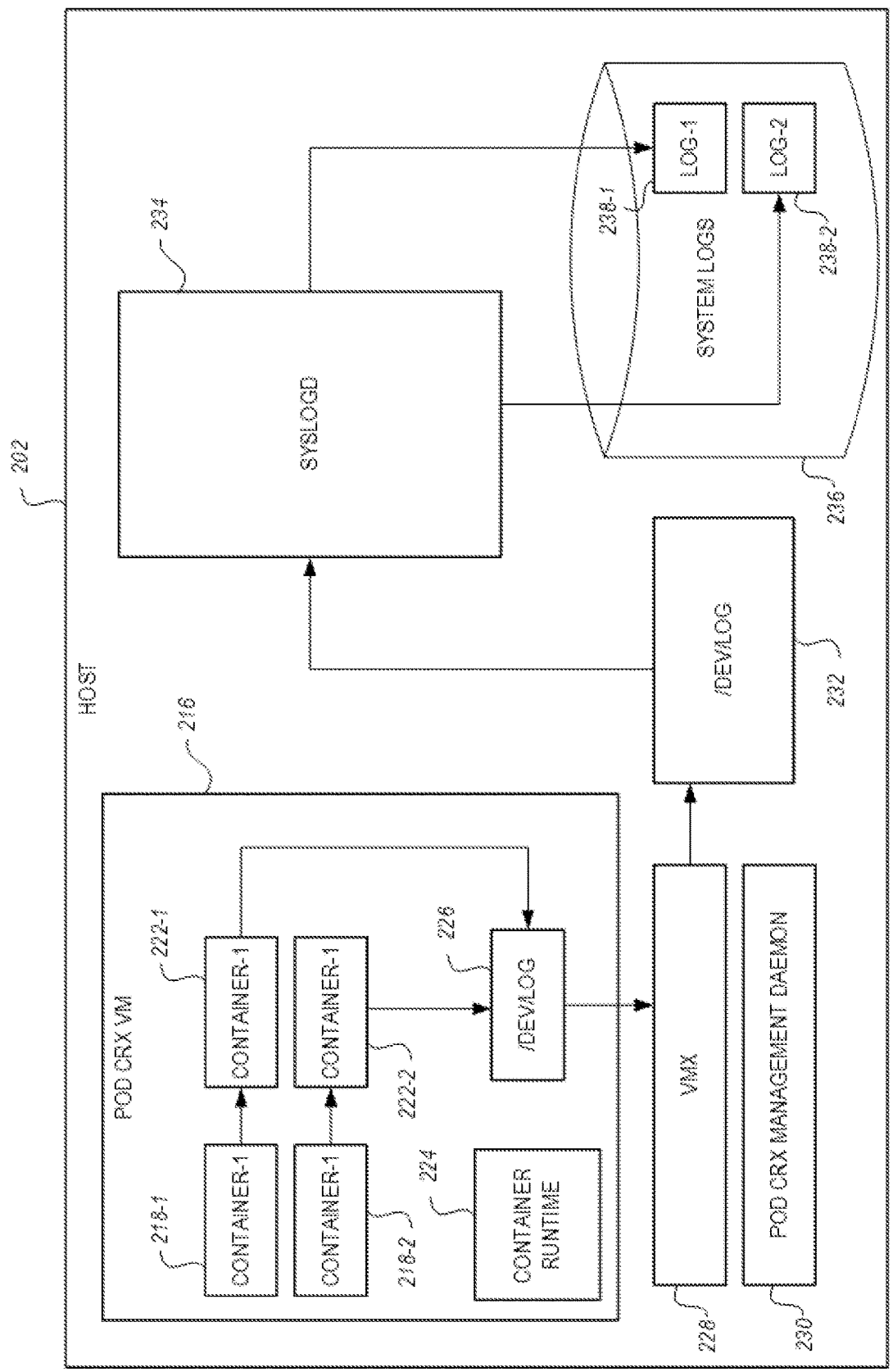
FIG. 2 is a block diagram illustrating a system for host storage of container logs in accordance with a number of embodiments of the present disclosure.

FIG. 2 is a block diagram illustrating a system for host storage of container logs in accordance with a number of embodiments of the present disclosure. A host 202 includes a VCI 216. In some embodiments, the VCI 216 may be referred to as a "Pod" or a "Pod VM." The VCI can be a Container Runtime for ESXi (CRX). As known to those of skill in the art, a CRX is a VCI that is optimized to run a Linux kernel that itself is optimized to run containers. As shown in the example illustrated in FIG. 2, one VCI 216 is shown having two containers: a first container 218-1 and a second container 218-2 (referred to cumulatively as "containers 218"). It is noted that embodiments herein are not so limited. The host 202 can include a different number of VCIs, each of which can include a different number of containers 218. The VCI can be managed by a VCI management component (referred to herein and shown in FIG. 2 as "Pod CRX Management Daemon") 230. The Pod CRX Management Daemon 230 can manage a number of aspects of the VCI 216, including its lifecycle, configuration, networking, storage, etc.

The containers 218 generate logs. The logs can be stored in buffers, for instance. A first log generated by the first container 218-1 (e.g., "log-1") is shown as being stored in a first buffer 222-1, and a second log generated by the second container 218-2 (e.g., "log-2") is shown as being stored in a second buffer 222-2. The logs can include information in a plurality of portions. For example, the logs can include relevant dates, time stamps, messages, identifiers of their respective generating containers, etc. A logical logging component (referred to herein and shown in FIG. 2 as "/dev/log") 226 can receive the logs from the buffers 222 and communicate them to a user space process (referred to herein and shown in FIG. 2 as "VMX") 228. The VMX 228 can emulate one or more devices. The VMX 228 is a process that runs in the VM kernel that is responsible for handling I/O to devices (e.g., devices that are not critical to performance). The VMX 228 is also responsible for communicating with user interfaces, snapshot managers, and remote console. The VMX 228 can receive the logs and communicate them to a logical logging component (/dev/log) 232 on the host 202, where they are then communicated to a logging process (referred to herein and shown in FIG. 2 as "syslog daemon" or "syslogd") 234. In some embodiments, syslogd 234 parses the logs, configures the logs, and stores them in files in host storage 236. As shown in FIG. 2, log-1 is stored in a first file 238-1, and log-2 is stored in a second file 238-2. The first file 218-1 corresponds to the first container 218-1, and the second file 238-2 corresponds to the second container 218-2.

In some embodiments, configuring a log includes formatting the log according to a standard. Some embodiments include standardizing the first log and the second log to a same format. As known to those of skill in the art, logs can be formatted according to a syslog protocol. Some logs may be in an RFC 5424 format. Some logs may be in an RFC 3164 format. The syslogd 234 can standardize logs to an RFC 5424 format.

As previously noted, the first file 218-1 corresponds to the first container 218-1, and the second file 238-2 corresponds to the second container 218-2. Embodiments herein can determine that log-1 corresponds to the first container 218-1 based on a first identifier included in log-1. Embodiments herein can determine that log-2 corresponds to the second container 218-2 based on a second identifier included in log-2.

Though not shown in FIG. 1, it is noted that in some embodiments, syslogd 234 can communicate logs from syslogd 234 to remote or network-attached storage outside the host 202. Such communication may be made instead of, or in addition to, storage on the host 202 in host storage 236.

Figure 3:
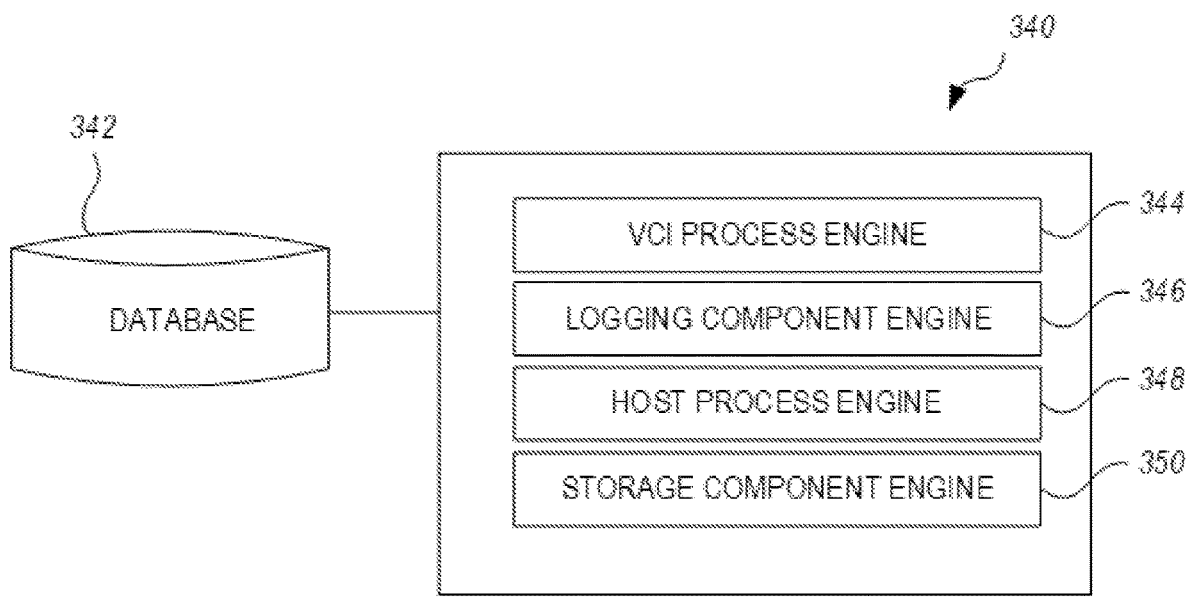
FIG. 3 is a diagram of a system 340 for host storage of container logs in accordance with a number of embodiments of the present disclosure.

FIG. 3 is a diagram of a system 340 for host storage of container logs in accordance with a number of embodiments of the present disclosure. The system 340 can include a database 342 and/or a number of engines, for example VCI process engine 344, logging component engine 346, host process engine 348, and/or storage component engine 350, and can be in communication with the database 342 via a communication link. The system 340 can include additional or fewer engines than illustrated to perform the various functions described herein. The system can represent program instructions and/or hardware of a machine (e.g., machine 452 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the VCI process engine 344 can include a combination of hardware and program instructions that is configured to XXXXXXXXXXXXXXXXXXXXXXX. In some embodiments, the logging component engine 346 can include a combination of hardware and program instructions that is configured to XXXXXXXXXXXXXXXXXXXXXX. In some embodiments, the host process engine 348 can include a combination of hardware and program instructions that is configured to XXXXXXXXXXXXXXXXXXXXXXX. In some embodiments, the storage component engine 350 can include a combination of hardware and program instructions that is configured to XXXXXXXXXXXXXXXXXXXXXX.

Figure 4:
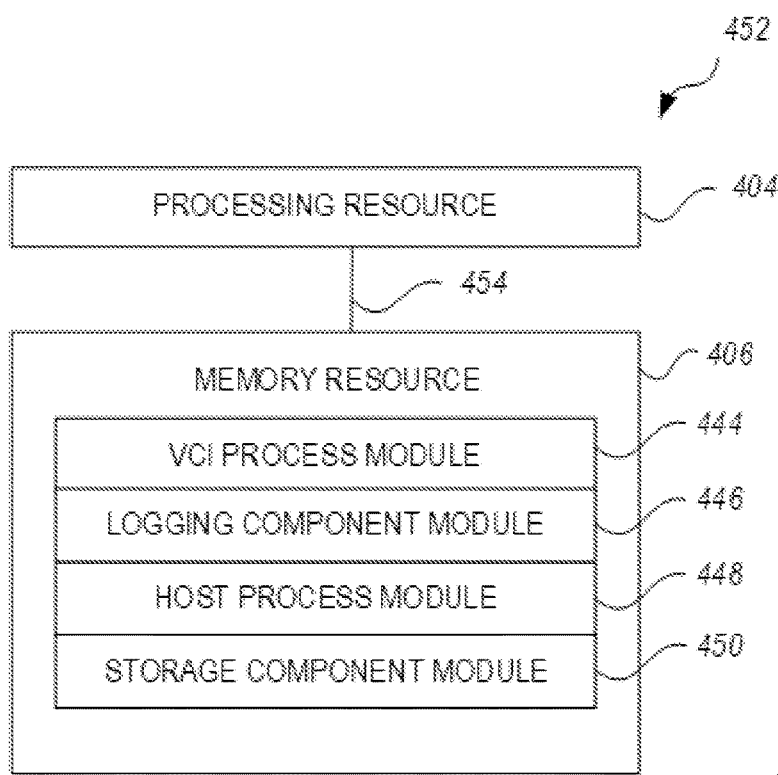
FIG. 4 is a diagram of a machine for host storage of container logs in accordance with a number of embodiments of the present disclosure.

FIG. 4 is a diagram of a machine for host storage of container logs in accordance with a number of embodiments of the present disclosure. The machine 452 can utilize software, hardware, firmware, and/or logic to perform a number of functions. The machine 452 can be a combination of hardware and program instructions configured to perform a number of functions (e.g., actions). The hardware, for example, can include a number of processing resources 404 and a number of memory resources 406, such as a machine-readable medium (MRM) or other memory resources 406. The memory resources 406 can be internal and/or external to the machine 452 (e.g., the machine 452 can include internal memory resources and have access to external memory resources). In some embodiments, the machine 452 can be a virtual computing instance (VCI). The program instructions (e.g., machine-readable instructions (MRI)) can include instructions stored on the MRM to implement a particular function (e.g., an action such as receiving a plurality of metrics, as described herein). The set of MRI can be executable by one or more of the processing resources 404. The memory resources 406 can be coupled to the machine 452 in a wired and/or wireless manner. For example, the memory resources 406 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 406 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 404 can be coupled to the memory resources 406 via a communication path 454. The communication path 454 can be local or remote to the machine 452. Examples of a local communication path 454 can include an electronic bus internal to a machine, where the memory resources 406 are in communication with the processing resources 404 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 454 can be such that the memory resources 406 are remote from the processing resources 404, such as in a network connection between the memory resources 406 and the processing resources 404. That is, the communication path 454 can be a network connection. Examples of such a network connection can include a local area network (LAN), wide area network (WAN), personal area network (PAN), and the Internet, among others.

As shown in FIG. 4, the MRI stored in the memory resources 406 can be segmented into a number of modules 436, 438, 440, 442, 444 that when executed by the processing resources 404 can perform a number of functions. As used herein a module includes a set of instructions included to perform a particular task or action. The number of modules 436, 438, 440, 442, 444 can be sub-modules of other modules. For example, the hash module 440 can be a sub-module of the cache module 442 and/or can be contained within a single module. Furthermore, the number of modules 436, 438, 440, 442, 444 can comprise individual modules separate and distinct from one another. Examples are not limited to the specific modules 436, 438, 440, 442, 444 illustrated in FIG. 4.

Each of the number of modules 436, 438, 440, 442, 444 can include program instructions and/or a combination of hardware and program instructions that, when executed by a processing resource 404, can function as a corresponding engine as described with respect to FIG. 3. For example, the request module 436 can include program instructions and/or a combination of hardware and program instructions that, when executed by a processing resource 404, can function as the request engine 336, though embodiments of the present disclosure are not so limited. The machine 452 can include a request module 436, which can include instructions to receive an API request for data from a database, wherein the request defines a time window of the data. The machine 452 can include a query module 438, which can include instructions to create a first query and a second query based on the request, wherein the first query corresponds to a first chunk of the time window, and wherein the second query corresponds to a second chunk of the time window. The machine 452 can include a hash module 440, which can include instructions to hash a first statement associated with the first query and a second statement associated with the second query. The machine 452 can include a cache module 442, which can include instructions to retrieve a first portion of the data corresponding to the first chunk of the time window from cache responsive to a determination that a key corresponding to the hash of the first statement is in the cache. The machine 452 can include a database module 444, which can include instructions to retrieve the first portion of the data corresponding to the first chunk of the time window from the database responsive to a determination that the key corresponding to the hash of the first statement is not in the cache.

In some embodiments, the machine 452 includes instructions to retrieve a second portion of the data corresponding to the second chunk of the time window from cache responsive to a determination that a key corresponding to the hash of the second statement is in the cache and retrieve the second portion of the data corresponding to the second chunk of the time window from the database responsive to a determination that the second key is not in the cache.

In some embodiments, the machine 452 includes instructions to retrieve the first portion of the data corresponding to the first chunk of the time window from the database regardless of whether (or even if) the key corresponding to the first statement is in the cache. For instance, the first portion of the data can be retrieved from the database responsive to an indication made by a user not to retrieve the first portion of the data from cache. In some embodiments, the first portion of the data can be retrieved from the database even if the key corresponding to the first statement is in the cache responsive to a determination that the first portion of the data does not exceed an age threshold. In time series data, for instance, some amount of time may pass before data becomes truly static. In one example, embodiments of the present disclosure can retrieve data from the database, instead of the cache, if the data does not exceed an age threshold (e.g., is less than 20 minutes old).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having instructions stored thereon which, when executed by a processor, cause the processor to:
   receive a log at a user space process of a host from a logical logging component of a virtual computing instance (VCI), wherein the log is generated by a container running on the VCI;
   communicate the log from the user space process to a logical logging component of the host;
   communicate the log from the logical logging component of the host to a logging process of the host; and
   configure the log and store the configured log in host storage;
   wherein the instructions to configure the log include instructions to standardize the log according to an RFC 5424 format.

2. The medium of claim 1, including instructions to:
   receive another log at the user space process of the host from the logical logging component of the VCI, wherein the other log is generated by another container running on the VCI;
   communicate the other log from the user space process to the logical logging component of the host;
   communicate the other log from the logical logging component of the host to the logging process of the host;
   configure the other log and store the other configured log in host storage.

3. The medium of claim 1, including instructions to receive the log by the logical logging component of the VCI from a buffer after the log is generated by the container.

4. The medium of claim 1, including instructions to communicate the log from the logging process to storage outside the host.

5. The medium of claim 1, wherein the VCI lacks persistent storage.

6. A method, comprising:
   receiving a first log and a second log at a user space process of a host from a logical logging component of a virtual computing instance (VCI), wherein the first log is generated by a first container running on the VCI, and wherein the second log is generated by a second container running on the VCI;
   communicate the first log and the second log from the user space process to a logical logging component of the host;
   communicate the first log and the second log from the logical logging component of the host to a logging process of the host; and
   configure the first log and the second log and store the first configured log and second configured log in host storage;
   wherein configuring the first log and the second log includes standardizing the first log and the second log to an RFC 5424 format.

7. The method of claim 6, wherein the method includes:
   receiving the first log by the logical logging component of the VCI from a first buffer after the first log is generated by the first container; and
   receiving the second log by the logical logging component of the VCI from a second buffer after the second log is generated by the second container.

8. The method of claim 6, wherein the method includes:
   storing the first configured log in a first file; and
   storing the second configured log in a second file.

9. The method of claim 6, wherein the method includes:
   storing the first configured log in a first file corresponding to the first container; and
   storing the second configured log in a second file corresponding to the second container.

10. The method of claim 9, wherein the method includes:
    determining that the first configured log corresponds to the first container based on a first identifier included in the first log; and
    determining that the second configured log corresponds to the second container based on a second identifier included in the second log.

11. The method of claim 6, wherein the method includes not allocating storage to the VCI.

12. The method of claim 6, wherein the host storage is dedicated storage for system logs.

13. A system, comprising:
    a VCI process engine configured to receive a log at a user space process of a host from a logical logging component of a virtual computing instance (VCI), wherein the log is generated by a container running on the VCI;
    a logging component engine configured to communicate the log from the user space process to a logical logging component of the host;
    a host process engine configured to communicate the log from the logical logging component of the host to a logging process of the host; and
    a storage component engine configured to configure the log and store the configured log in host storage;
    wherein the storage component engine is configured to standardize the log to an RFC 5424 format.

14. The system of claim 13, wherein the logging process of the host is a syslog daemon.

15. The system of claim 13, wherein no storage is allocated to the VCI.

\* \* \* \* \*